Figure 1:
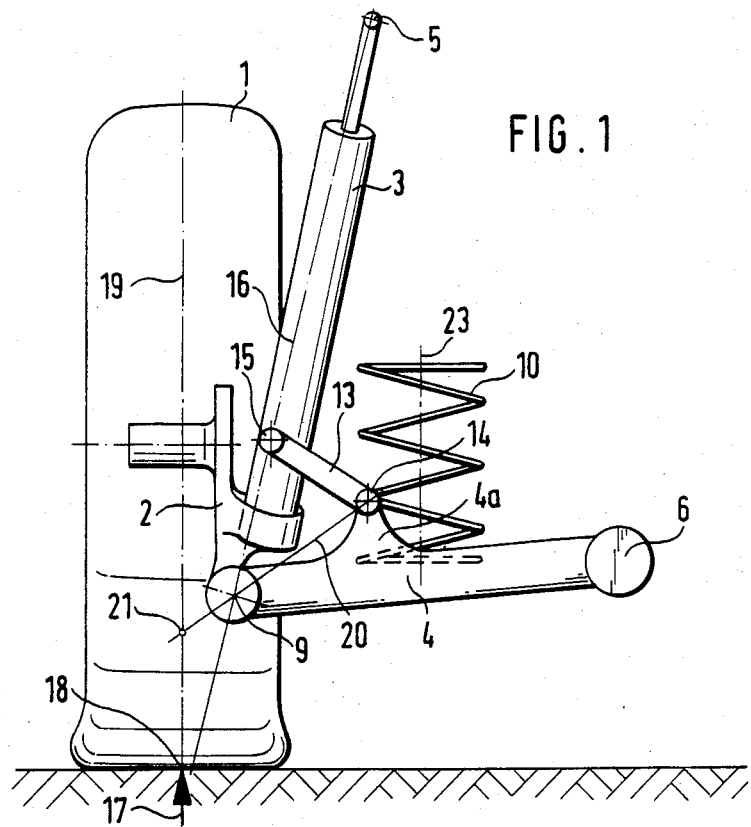

United States Patent [19]

Sautter

[11] Patent Number: 4,653,772
[45] Date of Patent: Mar. 31, 1987

[54] INDEPENDENT WHEEL SUSPENSION FOR MOTOR VEHICLES

[75] Inventor: Wolfgang Sautter, Gräfelfing, Fed. Rep. of Germany

[73] Assignee: Bayerische Motoren Werke Aktiengesellschaft, Fed. Rep. of Germany

[21] Appl. No.: 852,567

[22] Filed: Apr. 16, 1986

[30] Foreign Application Priority Data

Apr. 24, 1985 [DE] Fed. Rep. of Germany ....... 3514823

[51] Int. Cl.⁴ .............................................. B60G 3/00
[52] U.S. Cl. .................................... 280/666; 280/696
[58] Field of Search ............... 280/664, 666, 673, 675, 280/688, 690, 695, 696, 701

[56] References Cited

U.S. PATENT DOCUMENTS

| 4,202,563 | 5/1980 | Tattermusch | 280/675 |
| 4,377,298 | 3/1983 | Finn et al. | 280/696 |
| 4,556,238 | 12/1985 | Matschinsky | 280/673 |

FOREIGN PATENT DOCUMENTS

| 44579 | 6/1981 | European Pat. Off. | |
| 1455665 | 2/1971 | Fed. Rep. of Germany. | |
| 2249971 | 4/1974 | Fed. Rep. of Germany. | |
| 3005916 | 9/1981 | Fed. Rep. of Germany. | |
| 3139792 | 4/1983 | Fed. Rep. of Germany | 280/701 |
| 2069947 | 9/1981 | United Kingdom | 280/701 |

Primary Examiner—John J. Love
Assistant Examiner—Ross Weaver
Attorney, Agent, or Firm—Barnes & Thornburg

[57] ABSTRACT

An independent wheel suspension for motor vehicles, especially for steered vehicle wheels of passenger motor vehicles, which includes a shock absorber strut and a support arm connected thereat by way of a support joint. Additionally, an intermediate guide member connects the support arm and the shock absorber strut. A pivot axis between the universal joint on the side of the support arm and the support joint intersects the line of action of a vertical force engaging at the point of contact of the wheel. A connecting line between the universal joint of the support arm on the side of the body and the force line of action of a coil spring arranged on the support arm also extends through this point of intersection. The shock absorber strut is to be kept free of transverse forces by this construction.

8 Claims, 2 Drawing Figures

U.S. Patent   Mar. 31, 1987   4,653,772

INDEPENDENT WHEEL SUSPENSION FOR MOTOR VEHICLES

The present invention relates to an independent wheel suspension of motor vehicles, especially for steered vehicle wheels of passenger motor vehicles, with a shock absorber strut that is connected by way of a support joint with a support arm extending essentially transversely to the vehicle longitudinal axis and pivotally connected at the vehicle body.

The DE-OS No. 22 49 971 shows a wheel suspension of this type, in which the support joint is constructed as pivot joint. The pivot axis extends essentially in the vehicle longitudinal direction and is at a distance to the line of action of a vertical force engaging at the point of contact of the wheel. The vertical force produces a moment which causes transverse forces in the shock absorber strut. The consequence thereof is an increased friction between the sliding parts of the shock absorber strut which increases the break-away forces and impairs the spring comfort.

It is the object of the present invention to so further develop a wheel suspension of the aforementioned type that the shock absorber strut is far-reachingly kept free of such transverse forces.

The underlying problems are solved according to the present invention in that the support arm includes a universal joint on the side of the shock absorber strut and on the side of the body, in that an intermediate guide member additionally connects the shock absorber strut with the support arm and is connected at least at the support arm by means of a universal joint, in that the line of connection between the universal joint of the intermediate guide member on the support arm side and the support joint intersects in a point of intersection with its extension the line of action of a vertical force engaging in the point of contact of the wheel, and in that the line of connection between the point of intersection and the center point of the joint of the support arm joint on the side of the body intersects with the force line of action of the coil spring.

An ideal joint point of the pivotal connection between the shock absorber strut and the support arm on the line of action of the vertical force engaging in the point of contact of the wheel results from the present invention.

During the occurrence of such a force the vehicle wheel seeks to tilt about an axis which is formed between the universal joint on the support arm side and the support joint. Since this axis according to the present invention intersects the line of action of the vertical force, an undesired moment in the shock absorber is prevented.

On the other hand, the vertical force causes a force in the coil spring directed opposite the vertical force. Since the line of action of this force again is directed toward the line of connection between the support joint on the side of the body and the point of intersection of the aforementioned pivot axis with the line of action of the vertical force, this force pair also produces no moment stressing the shock absorber strut so that the latter remains altogether load-free.

In order to achieve the same effect, the support joint would have to be displaced with the prior art types of construction up to into the wheel center. Only in this position the vertical force could not produce any moment in the shock absorber strut. However, as a rule, no space is available for such an arrangement of the support joint because the space is required by parts of the brake, etc.

In practice it will not always be possible to let the pivot axis intersect exactly with the line of action of the vertical force. The point of intersection will possibly lie in close proximity thereto. In this case, of course, a moment again occurs stressing the shock absorber strut. However, if the moment remains sufficiently small, it can be neglected in view of the advantage achieved with the present invention to provide the support joint at a location which is not required by any other vehicle chassis or suspension parts.

If the pivot axis intersects the line of action of the vertical force in proximity of the road surface, then the support arm can absorb longitudinal and transverse forces in a particularly advantageous manner. Such a location of the pivot axis can be realized by the inventive concept in a simple manner in that the joint of the intermediate member on the support arm side is arranged higher, as viewed in the driving direction, than the support joint.

The wheel suspension according to the present invention is suited in particular for steered vehicle wheels without precluding thereby its application for non-steered wheels. In the case of the application with steered wheels, the intermediate guide member includes a universal joint also on the side of the shock absorber strut, through the joint center point of which must extend the steering axis of the vehicle wheel.

Figure 2:
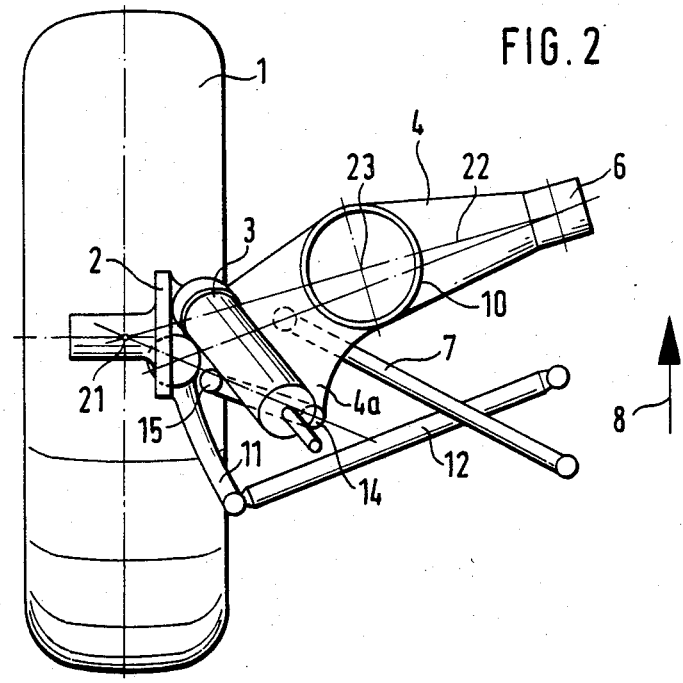

These and other objects, features and advantages of the present invention will become more apparent from the following description when taken in connection with the accompanying drawing which shows, for purposes of illustration only, one embodiment in accordance with the present invention, and wherein:

FIG. 1 is a schematic elevational view of a wheel suspension in accordance with the present invention, as viewed in the driving direction; and FIG. 2 is a plan view on the wheel suspension of FIG. 1.

Referring now to the drawing wherein like reference numerals are used throughout the two views to designate like parts, the independent wheel suspension illustrated in the drawing is to be provided for a steered vehicle wheel of a passenger motor vehicle. For the most part those parts are omitted in the figures which are not necessary for an understanding of the present invention.

A vehicle wheel 1 is supported on a wheel carrier 2. The wheel carrier 2 is pivotally connected by way of a shock absorber strut 3 and a support arm 4 at the vehicle body (not shown) or at structural parts secured thereon such as an auxiliary frame, etc. The shock absorber strut 3 is essentially vertically directed and is rigidly connected with the wheel carrier 2. With its other end the shock absorber strut 3 is supported at the vehicle body in a joint bearing 5.

According to FIG. 2 the support arm 4 extends essentially transversely to the vehicle longitudinal direction and is secured at the vehicle body by way of a universal joint 6. A support strut 7 which extends at an acute angle to the support arm 4, additionally connects the support arm 4 with the vehicle body. The support strut 7 also includes at both of its ends joints which, however, will not be described in detail in this application since they form no part of the present invention. As viewed in the driving direction, which is symbolically indicated in FIG. 2 by the arrow 8, the support arm 4 extends forwardly inwardly and the support strut 7 rearwardly inwardly.

A support joint 9 connects the support arm 4 with a wheel carrier 2 respectively with the shock absorber strut 3 secured thereon. Additionally, a coil spring 7 is seated on the support arm 4 which supports the vehicle body with its upper end. For the sake of completeness, FIG. 2 additionally shows a steering lever 11 secured at the wheel carrier 2 and a tie-rod 12 connected to the steering lever and leading to a steering gear (not shown).

An intermediate guide member 13 connects a protuberance-like extension 4a of the support arm 4 with the lower section of the shock absorber strut 3. The intermediate guide member 13 thereby includes at both ends one universal joint 14 and 15. As shown in FIG. 1, the extension 4a and therewith the universal joint 14 is disposed in a higher location than the universal joint 9. The universal joint 15 of the intermediate guide member 13 is located on the line of connection between the joint bearing 5 and the support joint 9. This connecting line, designated by reference numeral 16, forms the steering axis of the vehicle wheel 1.

In FIG. 1, a vertical force 17 engages at the point of contact 18 of the wheel. This vertical force 17 is produced by the weight of the vehicle and may increase or decrease during the drive as a result of unevenness of the road surface. The line of action of the vertical force 17 is designated by reference numeral 19. It extends vertically upwardly and coincides in the illustrated embodiment with the wheel center plane.

A connecting line 20 between the support joint 9 and the universal joint 14 of the intermediate guide member 13 on the support arm side forms the pivot axis, about which the vehicle wheel seeks to tilt during the occurrence of the vertical force 17. This connecting line 20 respectively pivot axis intersects the line of action 19 of the vertical force in a point 21. The extension of a connecting line 22 (FIG. 2) also extends through this point of intersection 21; the extension of the connecting line thereby extends between the joint center point of the universal joint 6 of the support arm 4 on the body side and the force line of action 23 of the coil spring 10.

For the sake of completeness it should be mentioned that during an inward (compression) spring movement of the vehicle wheel 1 the support arm 4 pivots about its joint 6 on the body side and thereby rotates about its longitudinal axis owing to the intermediate guide member 13.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. An independent wheel suspension for motor vehicles, comprising shock absorber strut means, support arm means extending essentially transversely to the vehicle longitudinal axis and pivotally connected to a relatively fixed vehicle part, support joint means operatively connecting the shock absorber strut means with the support arm means, the support arm means receiving a coil spring supporting the relatively fixed part, the support arm means including a universal joint means each at the side of the shock absorber strut means and at the side of the relatively fixed part, an intermediate guide member additionally operatively connecting the shock absorber strut means with the support arm means, said intermediate guide means being operatively connected by means of a universal joint means at least at the support arm means, the line of connection between the universal joint means of the intermediate guide member on the support arm side and a support joint means intersecting with its extension the line of action of a vertical force engaging at the point of contact of the wheel in a point of intersection, and the connecting line between the point of intersection and the joint center point of the support arm universal joint means on the side of the relatively fixed part substantially intersecting with the line of action of the coil spring.

2. A wheel suspension according to claim 1, wherein the suspension is for steered vehicle wheels of passenger motor vehicles.

3. A wheel suspension according to claim 1, wherein the relatively fixed part is a vehicle body part.

4. A wheel suspension according to claim 1, wherein the intermediate guide member includes a universal joint means on the side of the shock absorber strut means, whose joint center point is located substantially on the line of connection between a joint bearing of the shock absorber strut means at the relatively fixed part and the support joint means.

5. A wheel suspension according to claim 4, wherein the universal joint means of the intermediate guide member on the support arm side is at a higher location, as viewed in the driving direction, than the support joint means.

6. A wheel suspension according to claim 5, wherein the suspension is for steered vehicle wheels of passenger motor vehicles.

7. A wheel suspension according to claim 5, wherein the relatively fixed part is a vehicle body part.

8. A wheel suspension according to claim 1, wherein the universal joint means of the intermediate guide member on the support arm side is at a higher location, as viewed in the driving direction, than the support joint means.